United States Patent
Lingafelt et al.

(10) Patent No.: US 8,243,904 B2
(45) Date of Patent: Aug. 14, 2012

(54) METHODS TO IMPROVE SECURITY OF CONFERENCE CALLS BY OBSERVATION OF ATTENDEES' ORDER AND TIME OF JOINING THE CALL

(75) Inventors: Charles Steven Lingafelt, Durham, NC (US); James William Murray, Research Triangle Park, NC (US); James Thomas Swantek, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/631,440

(22) Filed: Dec. 4, 2009

(65) Prior Publication Data

US 2011/0135082 A1  Jun. 9, 2011

(51) Int. Cl.
  *H04M 3/56* (2006.01)
  *H04N 7/15* (2006.01)
  *H04L 12/18* (2006.01)
  *G06F 15/16* (2006.01)

(52) U.S. Cl. ................ 379/202.01; 348/14.08; 370/260; 379/203.01; 455/416; 709/204

(58) Field of Classification Search .......... 370/260–262; 379/188, 189, 196–198, 202.01–206.01, 379/93.21, 158; 348/14.08–14.1; 455/416; 709/204, 205

See application file for complete search history.

(56) References Cited

U.S. PATENT DOCUMENTS

| | | | |
|---|---|---|---|
| 5,555,551 A | 9/1996 | Rudokas et al. | |
| 5,903,629 A | 5/1999 | Campbell, IV et al. | |
| 5,907,602 A | 5/1999 | Peel et al. | |
| 5,959,662 A * | 9/1999 | Shaffer et al. | 348/14.08 |
| 6,141,406 A | 10/2000 | Johnson | |
| 6,219,538 B1 | 4/2001 | Kaminsky et al. | |
| 6,327,352 B1 | 12/2001 | Betts et al. | |
| 6,879,673 B2 * | 4/2005 | Creamer et al. | 379/207.01 |
| 7,046,779 B2 * | 5/2006 | Hesse | 379/202.01 |
| 7,106,843 B1 | 9/2006 | Gainsboro et al. | |
| 7,119,828 B1 | 10/2006 | Kizhnerman et al. | |
| 7,197,560 B2 | 3/2007 | Caslin et al. | |
| 7,266,188 B2 | 9/2007 | Carlson | |
| 7,308,090 B2 | 12/2007 | White et al. | |

(Continued)

OTHER PUBLICATIONS

Jakobsson, Markus, et al., "Delayed Password Disclosure" ACM SIGACT News, Sep. 2007, p. 56-75, vol. 38, No. 3.

(Continued)

*Primary Examiner* — Harry Hong
(74) *Attorney, Agent, or Firm* — Cahn & Samuels, LLP (57) ABSTRACT

An embodiment of the invention includes a method for detecting fraudulent use in a conference calling system. A threshold period is received, wherein the threshold period indicates the maximum allowable time period for a participant of a conference call to enter the conference call prior to the entry of the moderator of the conference call. A monitor detects the entry of the moderator into the conference call and entry of the participants into the conference call. A waiting period is determined for one or more of the participants, wherein the waiting period represents the time period between the entry of the moderator and the entry of the participant. A processor compares the waiting period to the threshold period. If the threshold period exceeds the waiting period, the conference call is allowed to continue. In at least one embodiment, actions are performed with the processor if the waiting period exceeds the threshold period.

25 Claims, 7 Drawing Sheets

U.S. PATENT DOCUMENTS

| | | | |
|---|---|---|---|
| 7,319,745 | B1 | 1/2008 | Firestone |
| 7,343,008 | B1 | 3/2008 | Frankel |
| 2004/0141605 | A1 | 7/2004 | Chen et al. |
| 2004/0170265 | A1 | 9/2004 | Benco et al. |
| 2005/0018827 | A1 | 1/2005 | Himmel et al. |
| 2005/0265537 | A1 | 12/2005 | Verbil et al. |
| 2007/0036314 | A1 | 2/2007 | Kloberdans et al. |
| 2007/0073519 | A1 | 3/2007 | Long |
| 2007/0150583 | A1 | 6/2007 | Asthana et al. |
| 2007/0171898 | A1 | 7/2007 | Salva |
| 2007/0263085 | A1* | 11/2007 | Marton et al. ............. 348/14.09 |
| 2008/0013706 | A1* | 1/2008 | Kelley et al. ............. 379/202.01 |
| 2008/0232277 | A1 | 9/2008 | Foo et al. |
| 2008/0267093 | A1* | 10/2008 | Mohan ......................... 370/260 |

OTHER PUBLICATIONS

Jakobsson, Markus, et al., "Quantifying the Security of Preference-based Authentication" DIM '08, Oct. 31, 2008, p. 61-69, Fairfax, Virginia, USA.

Widder, Alexander, et al., "Identification of Suspicious, Unknown Event Patterns in an Event Cloud" DEBS '07, Jun. 20-22, 2007, Toronto, Canada.

Yee, Ka-Ping, et al., "Passpet: Convenient Password Management and Phishing Protection" Symposium on Usable Privacy and Security (SOUPS) 2006, Jul. 12-14, 2006, p. 32-43, Pittsburgh, PA, USA.

Zhang, Yongguang, et al., "Intrusion Detection Techniques for Mobile Wireless Networks" Wireless Networks 9, 2003, p. 545-556.

Zhang, Zheng, et al., "CycleMeter: Detecting Fraudulent Peers in Internet Cycle Sharing" SC2006, Nov. 2006, Tampa, Florida, USA.

Department of Veteran Affairs, "Nationwide Teleconferencing System (VANTS) Policy" VHA DIRECTIVE 99-021, May 11, 2009.

LiveOffice TeleConferencing, Conference Calling: Toll Free Teleconferencing for Conference by LiveOffice Conferencing, http://teleconference.liveoffice.com/conferencehostfaq.asp, printed Feb. 24, 2009.

Spiderphone.com, Spiderphone Conference Calls, http://www.spiderphone.com/About/ServiceDescription.asp, printed Feb. 24, 2009.

* cited by examiner

METHODS TO IMPROVE SECURITY OF CONFERENCE CALLS BY OBSERVATION OF ATTENDEES' ORDER AND TIME OF JOINING THE CALL

BACKGROUND

The present invention is in the field of methods, systems, and computer program products to improve security of conference calls by observation of attendees' order and time of joining the call.

A conference call (also known as a "teleconference" or a "teleconference call") is a telephone call in which the calling party wishes to have more than one called party participate in the audio portion of the call. The conference call may be designed to allow the called party to participate during the call, or the call may be set up so that the called party merely listens into the call and cannot speak. It is often referred to as an ATC (Audio Tele-Conference). In addition to audio, conference calls can include video, multimedia and other communication methods.

Conference calls can be designed so that the calling party calls the other participants and adds them to the call; however, participants are usually able to call into the conference call without assistance from an "operator" of the conference system, by dialing into a special telephone number that connects to a "conference bridge" (a specialized type of equipment that links telephone lines).

Companies commonly use a specialized service provider who maintains the conference bridge, or who provides the phone numbers and PIN codes that participants dial to access the meeting or conference call.

SUMMARY

An embodiment of the invention includes a method for detecting fraudulent use in a conference calling system. A threshold period is received, wherein the threshold period indicates the maximum allowable time period for a participant of a conference call to enter the conference call prior to the entry of the moderator of the conference call. A monitor detects the entry of the moderator into the conference call and entry of the participants into the conference call.

A waiting period is determined for one or more of the participants, wherein the waiting period represents the time period between the entry of the moderator and the entry of the participant. A processor compares the waiting period to the threshold period. If the threshold period exceeds the waiting period, the conference call is allowed to continue. However, actions are performed with the processor if the waiting period exceeds the threshold period.

The actions include sending an alert indicating that the waiting period exceeded the threshold period to the moderator, an administrator of the conference calling system, participants of the conference call, and/or security personnel. Another action validates credentials of the participants. More specifically, passcodes to enter the conference call are received from the participants. For each passcode entered, first information (also referred to herein as "user information") is obtained from the person assigned the passcode. The first information includes an employee number, an identification badge number, a home telephone number, a home address, a mobile telephone number, an e-mail address, an office telephone number, an office address, and/or answer(s) to security question(s) entered by the person assigned the passcode. Second information (also referred to herein as "validation information") is obtained from the participant who entered the passcode. If the first information matches the second information, an alert is sent to the participant indicating that the waiting period exceeds the threshold period.

Further actions include permitting the administrator of the conference calling system to enter the conference call, disconnecting a participant from the conference call, terminating the conference call, and/or voiding a passcode to the conference call. Another action generates and stores a report, where the report includes the time of entry of the moderator, the time of the entry of the participants, the threshold period, the waiting periods, and/or the passcodes to the conference call. The report also includes the actions performed, including the user information from the person assigned a passcode, and the validation information from the participant.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
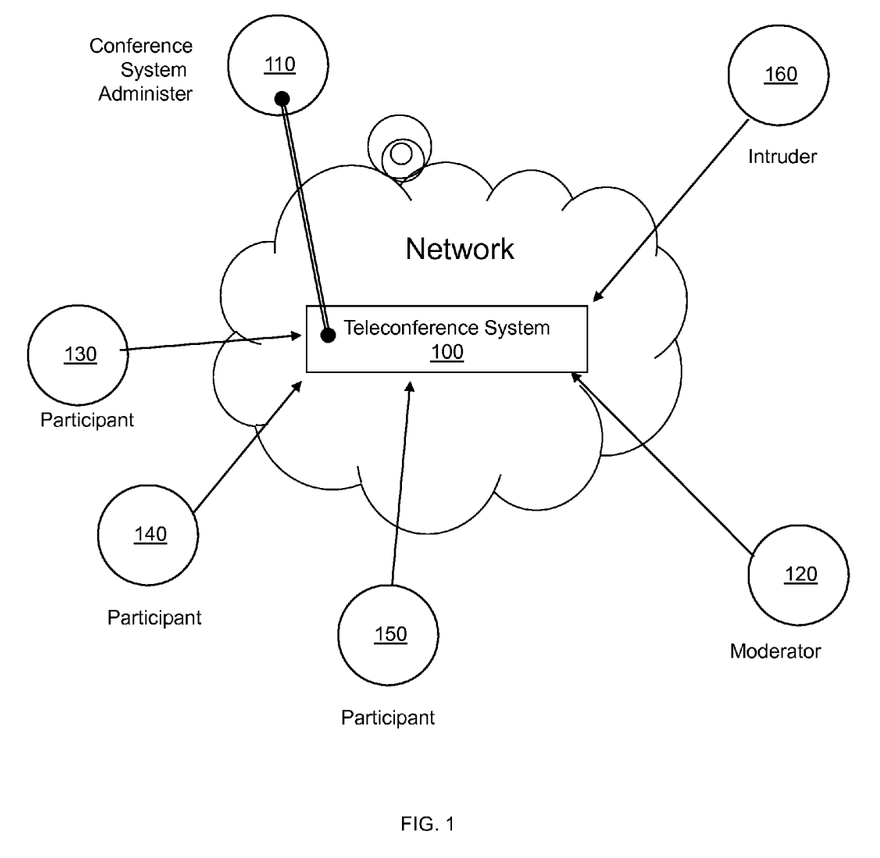
FIG. 1 illustrates a conference calling system according to embodiment of the invention.

FIG. 1 illustrates a conference calling system (also known as a teleconference system) 100 according to embodiment of the invention, wherein a conference system administrator 110, conference moderator 120, participants 130, 140, and 150, and unauthorized intruder 160 are connected to the conference calling system 100. The conference moderator 120, participants 130, 140, and 150, and unauthorized intruder 160 are attendees of the conference calling system 100. In another embodiment, less than or more than three participants are connected to the conference calling system 100.

In order to connect to the conference calling system 100, the participants 130, 140, and 150 use a reservationless bridge. The bridge setup is dynamic, wherein a call-in telephone number and a passcode from the conference moderator 120 are sufficient to begin the conference call. The participants 130, 140, and 150 have the same passcode (i.e., Passcode A), which is different from the passcode of the conference moderator 120 (i.e., Passcode Z). In another embodiment of the invention, the participants 130, 140, and 150 have different passcodes (e.g., Passcodes A, B, and C, respectively). In one embodiment, the intruder 160 has the conference moderator 120's passcode (i.e., Passcode Z). In another embodiment, the intruder 160 utilizes a participant's passcode (i.e., Passcode A, B, or C, depending on how passcodes are assigned) to connect to the conference calling system 100.

The conference system administer 110 configures the conference calling system 100 and assures its operation. These functions are embodied in the service provider of the conference calling system (not shown). However, in one embodiment, these functions are delegated to the purchaser of the conference calling service. In another embodiment, an automatic monitoring system is utilized to configure the conference calling system 100 and assures its operation.

Having a passcode (either the passcode of the moderator 120 and/or one of the participants 130, 140, and 150), the intruder 160 can either enter a conference call as an attendee during a legitimate meeting; or, the intruder 160 can establish an illegitimate meeting between himself and other intruders. In the fraud scenario illustrated in FIG. 1, the conference call was already in-process when the conference moderator 120 connected to the conference calling system 100. Without the fraud detection methodologies and systems herein, the conference calling system 100 does not inform the conference moderator 120 that another individual had joined the conference call early. Thus, the conference moderator 120 is not aware of the fraud by the intruder 160.

In one example of fraud, the intruder 160 connects to the conference calling system and waits until a conference call begins. This allows the intruder 160 to obtain information during the conference call. The intruder 160 is also allowed to use the conference calling system for other purposes after the moderator 120 and participants 130-150 disconnect from the conference calling system, for example, holding another conference call by sharing the passcode with others. By detecting when a person joins the conference call more than a threshold time period prior to initiation of the conference call by the moderator 120, an embodiment of the invention alerts the moderator 120 of the person's early arrival and gives the moderator 120 the option to remove the person and/or alert others of potential fraud.

Figure 2:
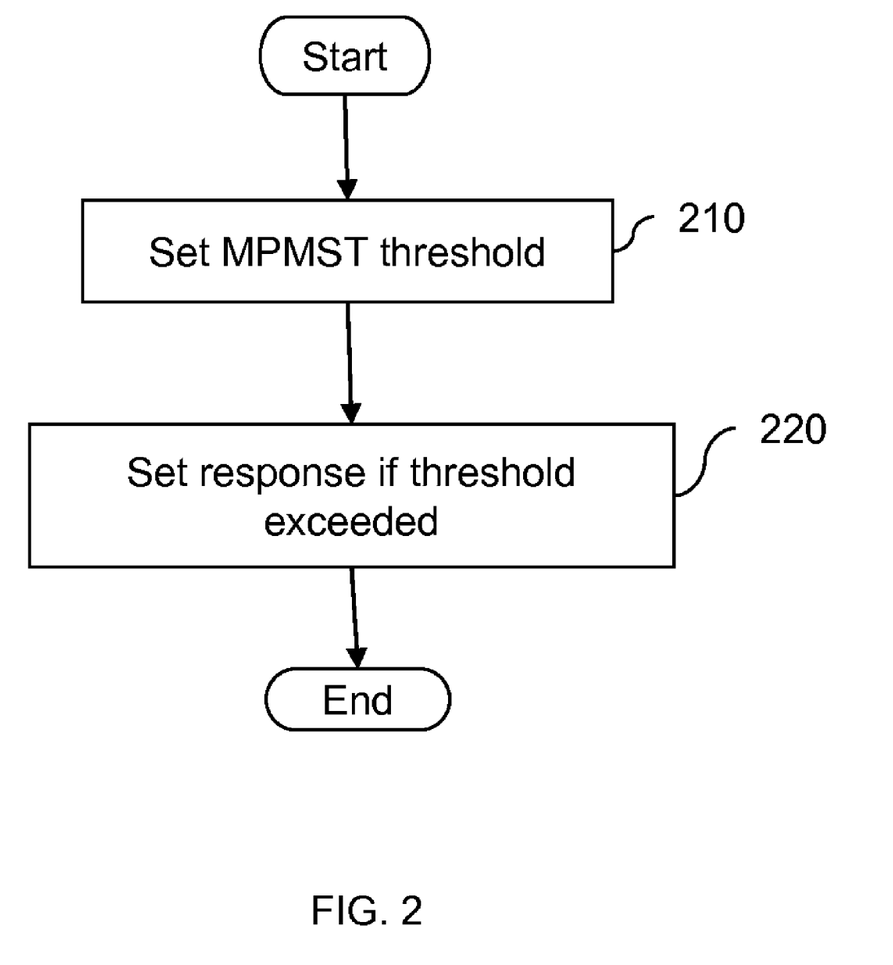
FIG. 2 is a flow diagram illustrating a preparation phase according to an embodiment of the invention.

FIG. 2 is a flow diagram illustrating a preparation phase according to an embodiment of the invention. The preparation phase sets up a Maximum Prior to Meeting Start Time (MPMST) threshold (210), which is used to identify potential intruders who have entered into the conference calling system too early. For example, the MPMST threshold is set to identify a potential intruder who has entered into the conference calling system more than one hour before the moderator. Response actions (e.g., notify conference system administrator) are also set up during the preparation phase (220), which the conference calling system will perform if the threshold is exceeded, as more fully described below with reference to FIGS. 3-4.

Figure 3:
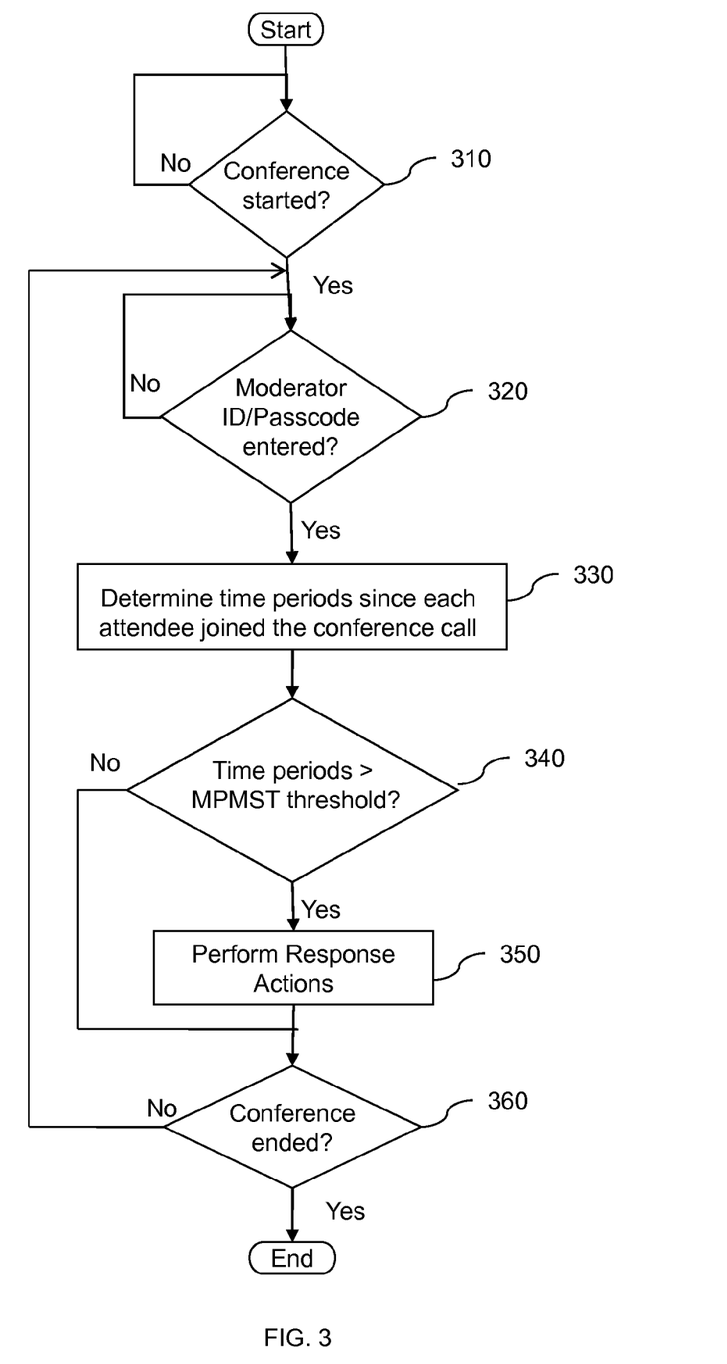
FIG. 3 is a flow diagram illustrating a method to improve security of conference calls by observation of attendees' order and time of joining the call according to an embodiment of the invention.

An embodiment of the invention includes a method to identify potentially fraudulent access to a conference calling system by observing joining time of individuals and providing notification to the moderator if an individual joins too early (as defined by a threshold value). FIG. 3 is a flow diagram illustrating a method to improve security of conference calls by observation of attendees' order and time of joining the call according to an embodiment of the invention. More specifically, the conference calling system determines whether the conference call has begun (310) and whether the moderator ID and/or passcode has been entered (320).

If the moderator ID and/or passcode has been entered, the conference calling system determines the time periods since each attendee joined the conference call (330), i.e., the time periods between when each attendee entered their respective passcode and when the moderator entered the moderator ID and/or passcode. In another embodiment, the conference calling system determines attendee waiting periods before the moderator ID and/or passcode is entered, wherein the conference calling system determines the time periods between when each attendee entered their respective passcode and when the first ID and/or passcode was entered. The attendees of the conference call access the conference calling system using either a participant passcode or the moderator ID and/or passcode. In an alternative embodiment, the conference calling system determines the time periods since each attendee joined the conference call and when the conference call was scheduled to take place. For example, if the conference call was scheduled for 12:00 (noon) and an attendee entered the passcode at 10:30 a.m., then the conference calling system determines that the attendee accessed the conference calling system an hour and a half early.

The conference calling system determines whether the time periods that the attendees joined the conference call are greater than the MPMST threshold (340). For instance, in the preceding example, if the MPMST threshold is 30 minutes, the conference calling system determines that the attendee entered the passcode too early.

If a time period that an attendee joined the conference call is greater than the MPMST threshold, then the conference calling system performs response actions (350), as more fully described below with reference to FIG. 4. The conference call is allowed to continue and response actions are not performed if the time period for joining the conference call (also referred to herein as a "waiting period") is less than the MPMST threshold for each attendee of the conference call. After the time periods are validated or response actions are taken, the conference call is ended (360).

Figure 4:
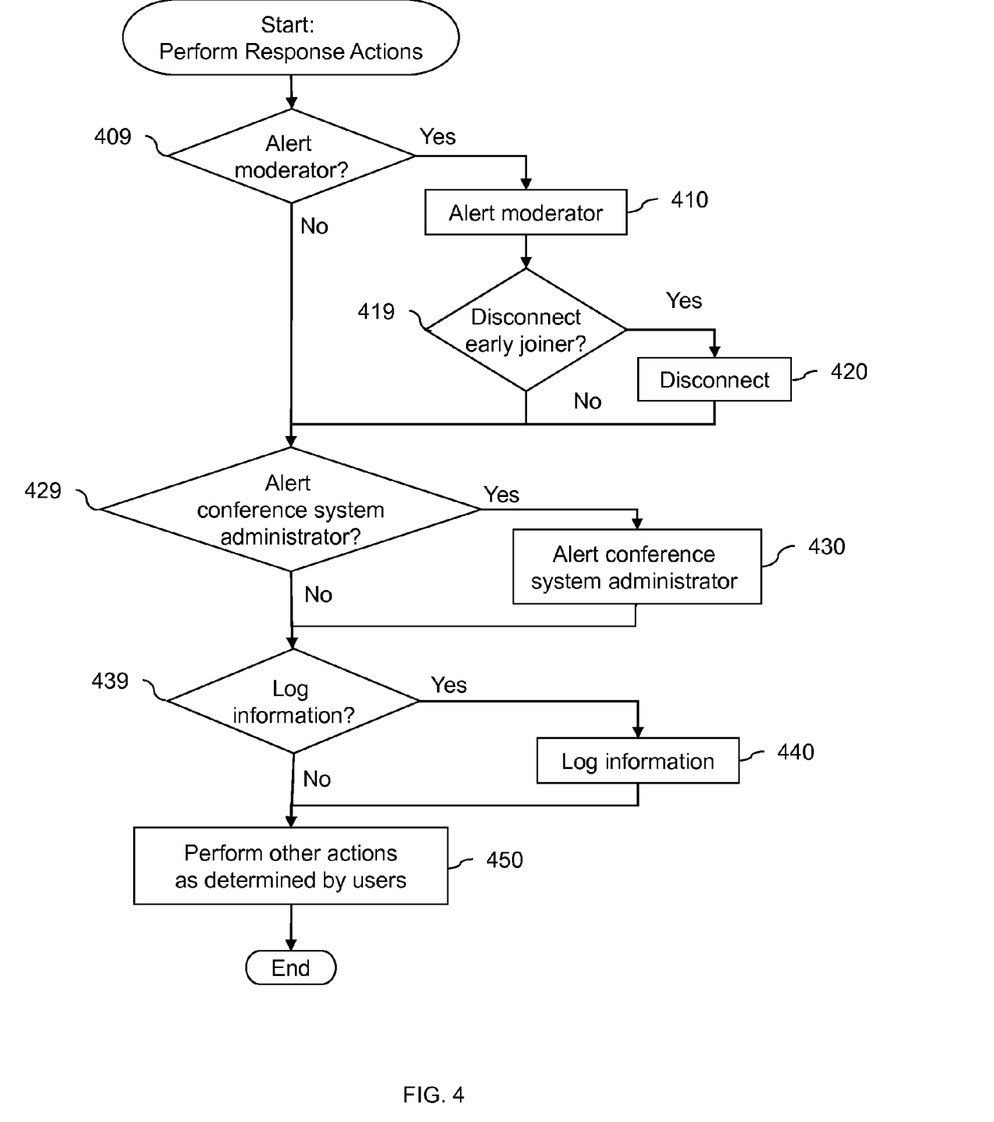
FIG. 4 is a flow diagram illustrating a method for performing response actions according to an embodiment of the invention.

FIG. 4 is a flow diagram illustrating a method for performing response actions according to an embodiment of the invention. In alternative embodiments, one or more of the response actions illustrated in FIG. 4 are omitted, dependent on the configuration as determined in the preparation phase. As described below, in at least one embodiment, the response actions illustrated in FIG. 4 are performed by a processor connected to a user interface.

The processor determines whether to alert the moderator (409). The "true moderator" is the actual person that has been assigned the moderator passcode by the conference calling system or the conference system administrator. The true moderator is alerted if that person is known by the conference calling system; or, if the true moderator is not known by the conference calling system, all of the moderators that have entered the moderator passcode are alerted by the processor, i.e., the true moderator and the intruder if masquerading as a moderator (410). The alert includes a notification that an attendee has accessed the conference calling system too early, i.e., the time period since an attendee entered a passcode and when a moderator ID and/or passcode was entered exceeded the MPMST threshold. In at least one embodiment of the invention, the alert also includes the total number of attendees, i.e., the total number of moderator IDs and/or passcodes and participant passcodes entered into the conference calling system and the time periods since the attendees joined the conference call and when the moderator ID and/or passcode was entered. In at least one embodiment, the alerts include a time stamped e-mail, text message, instant message, facsimile, and/or other form of communication indicating that the MPMST threshold has been exceeded by an attendee of the conference call. In another embodiment, as described below, the conference administrator and/or conference call participants are alerted instead of the moderator. In yet another embodiment, if the MPMST threshold is exceeded prior to the moderator's entry into the conference call, the alert is not sent to the moderator until the moderator ID and/or passcode is entered.

The true moderator is given the option to disconnect the attendee that joined the conference call too early from the conference calling system (419). The true moderator either allows the attendee that joined the conference call too early to participate in the conference call, or the attendee is disconnected from the conference calling system (420). In an alternative embodiment, the conference calling system automatically disconnects the attendee that joined the conference call too early.

The processor determines whether to send an alert to the conference system administrator (429). If the conference system administrator is alerted by the processor (430), further actions are automatically or manually performed by the conference system administrator. In at least one embodiment of the invention, such actions are setup prior to initiation of the conference call (e.g., during the preparation phase). The conference system administrator actions include monitoring for additional occurrences where the MPMST threshold has been exceeded by an attendee of the conference call, terminating the conference call, and/or blocking the account from further usage (i.e., voiding the moderator ID and/or passcode).

The processor determines whether to log information for future reference and reporting into, for example, a report database (439). The processor logs information (440) by saving a report of the occurrence, wherein the report includes, for example, at least one of the MPMST threshold, the time periods since the attendees accessed the conference calling system and when a moderator ID and/or passcode was entered into the conference calling system, the moderator ID and/or passcode, the time and date that the MPMST threshold was exceeded, the total number of moderator IDs and/or passcodes entered into the conference calling system, the total number of participant passcodes entered, the telephone numbers of the attendees that called into the conference calling system (obtained from a caller-identification system), and a detailed description of the response action(s) taken after the MPMST threshold was exceeded, e.g., identification of personnel who received alerts from the conference calling system. Information in the report is utilized to identify trends, track moderator ID and/or passcode usage, and/or for detailed review by the conference system administrator and/or personnel within the true moderator's company. For example, in at least one embodiment, the conference system administrator compares reports that have been collected over time in order to identify trends, such as a particular passcode that repeatedly violates the MPMST threshold and/or a particular time of day that the MPMST threshold is frequently violated.

The processor also performs other actions as determined by users of the conference calling system (450). For example, in at least one embodiment of the invention, the processor requests additional identification and/or credentials from the attendee that accessed the conference calling system too early. The identification includes the attendee's corporate employee number and/or ID badge number. The credentials may include, for example, at least one of the attendee's home telephone number, home address, mobile telephone number, e-mail address, office telephone number, office address, and secret question(s) entered when the attendee was assigned the passcode(s) (e.g., pet's name, date of birth, mother's maiden name). The conference calling system determines whether the information entered by the attendee that accessed the conference calling system too early matches the actual identification and/or credentials of the attendees. In at least one embodiment, the actual identification and/or credentials are obtained from the attendees during the preparation phase.

In another embodiment of the invention, the processor also determines whether to alert others (in addition to or alternatively to the person assigned the passcode and/or the moderator). Alerting others includes sending an alert indicating that the MPMST threshold has been exceeded to at least one of administrative personnel of the conference calling system provider and security personnel employed by the true moderator's company who is responsible for tracking risks and investigating fraud across the company. In another embodiment, the conference calling system voids the passcode entered by the attendee that accessed the conference calling system too early. For example, in at least one embodiment, a passcode is voided or temporarily disabled after 5 unsuccessful attempts to access the conference calling system in a 24 hour period. In yet another embodiment, the conference calling system automatically captures an audio recording of the conference call when the MPMST threshold is exceeded. In still yet another alternative embodiment, the response actions illustrated in FIG. 4 are performed in another order, e.g., the conference system administer is alerted prior to alerting the moderator.

Figure 5:
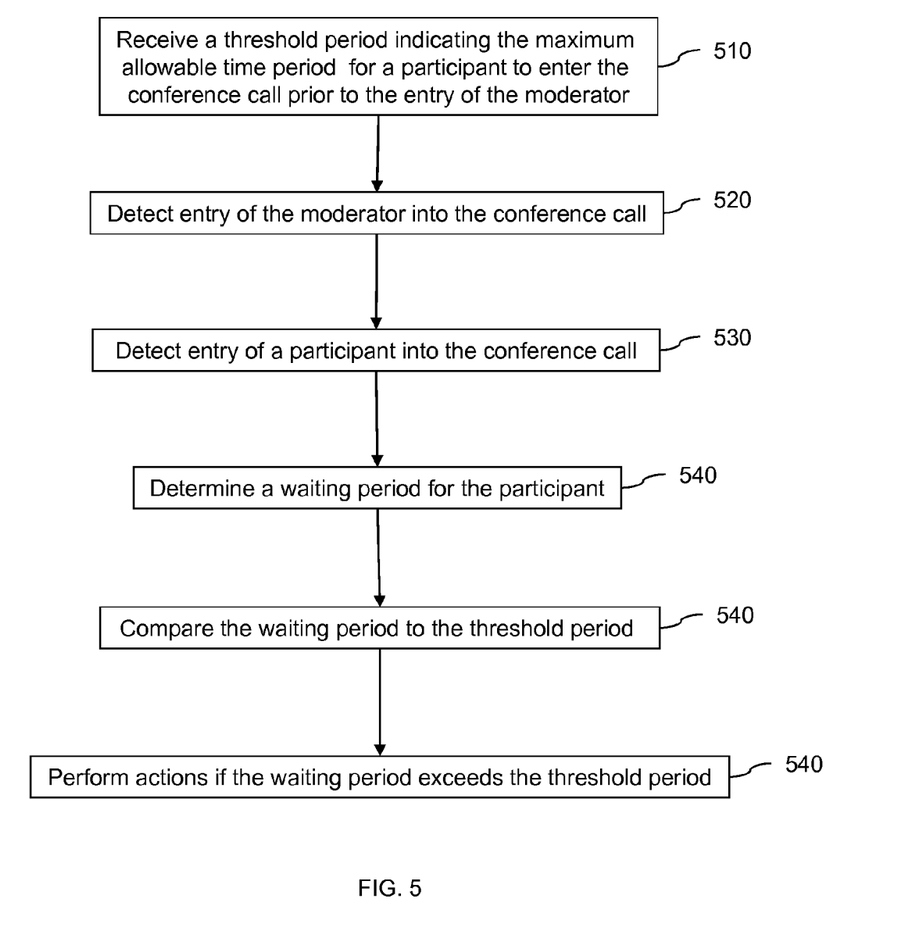
FIG. 5 is a flow diagram illustrating a method for detecting fraudulent use of a passcode in a conference calling system according to an embodiment of the invention.

FIG. 5 is a flow diagram illustrating a method for detecting fraudulent use in a conference calling system according to an embodiment of the invention. A threshold period is received, wherein the threshold period indicates the maximum allowable time period for a participant of a conference call to enter the conference call prior to the entry of the moderator of the conference call (510). The threshold period (also referred to herein as the "Maximum Prior to Meeting Start Time threshold" or "MPMST threshold") is received from a user interface 610 during the preparation phase (See FIG. 6). The MPMST threshold is used to identify potential intruders who have entered the conference call too early. For example, the MPMST threshold is set to identify a potential intruder who has entered the conference call more than one hour before the moderator.

In another embodiment, the threshold period indicates the maximum allowable time period for an attendee of the conference call to enter the conference call prior to a scheduled start time for the conference call. Thus, for example, if the conference call was scheduled for 1:00 p.m. and the threshold period is 60 minutes, an attendee entering the conference call at 11:30 a.m. would violate the threshold period.

Figure 6:
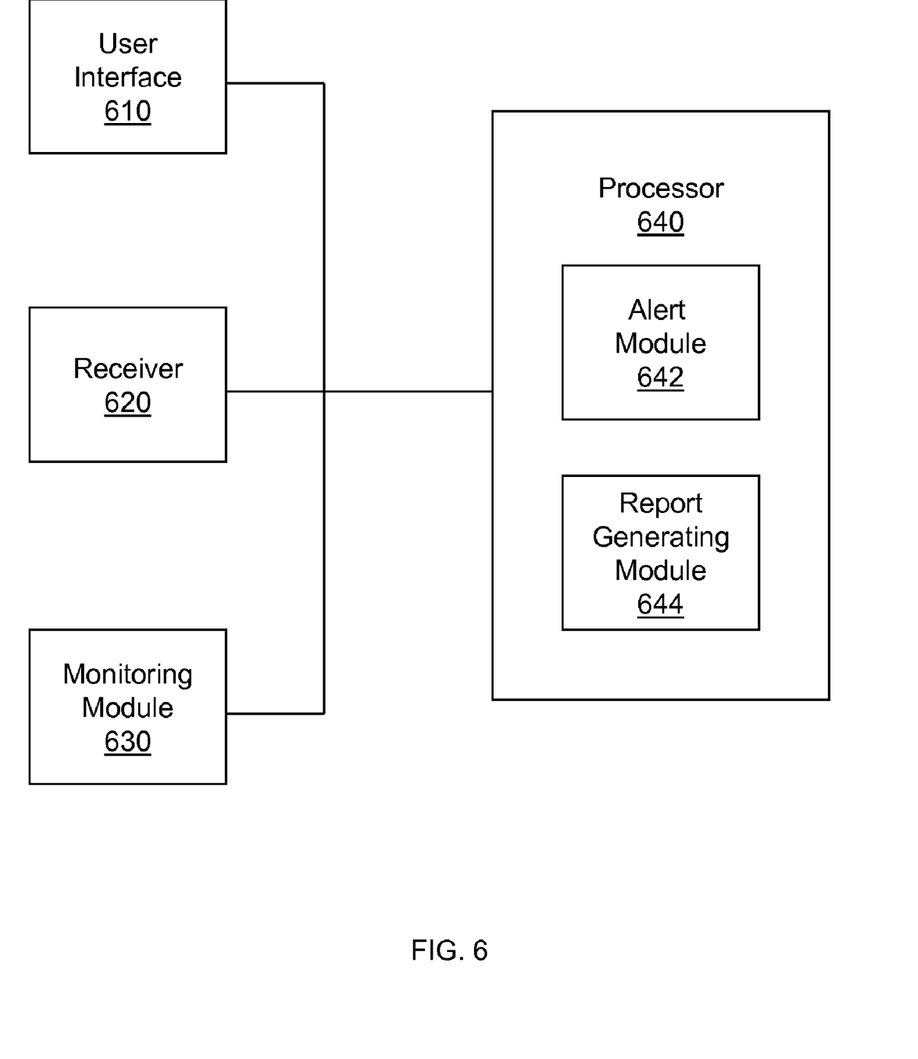
FIG. 6 illustrates a system for detecting fraudulent use of a passcode in a conference calling system according to an embodiment of the invention.

A receiver 620 receives passcodes to enter the conference call from the attendees. A monitoring module 630 detects the reception of the passcodes by the receiver 620. Thus, the monitoring module 630 detects entry of the moderator into the conference call (520) and entry of the participants into the conference call (530). In at least one embodiment, the monitoring module 630 sends a message to a processor 640 indicating the time of entry of the attendees of the conference call.

The processor 640 determines a waiting period for one or more of the participants (540), wherein the waiting period represents the time period between the entry of the moderator and the entry of the participant. In another embodiment, the waiting period represents the time period between entry of an attendee and the scheduled start time of the conference call. The processor 640 compares the waiting period to the threshold period (550). If the threshold period exceeds the waiting period, the conference call is allowed to continue. However, actions are performed with the processor 640 if the waiting period exceeds the threshold period (560).

The actions (also referred to herein as "response actions") include, in at least one embodiment, sending an alert indicating that the waiting period exceeded the threshold period to the moderator, an administrator of the conference calling system, participants of the conference call, and/or security personnel of the teleconference provider and/or at least one company employing a participant of the teleconference call. The alert is sent from an alert module 642 in the processor 640, wherein the alert includes a time stamped e-mail, text message, instant message, facsimile, and/or other form of communication indicating that a participant has entered the conference call too early. In another embodiment, the alert module is outside of the processor 640. In at least one embodiment of the invention, the alert also includes the total number of attendees, i.e., the total number of moderator IDs and/or passcodes and participant passcodes entered into the conference call, the time periods since the participants joined the conference call, and when the moderator ID and/or passcode was entered.

In at least one embodiment, the actions validate credentials of the participants by verifying information obtained from authorized users in the preparation phase. More specifically, passcodes to enter the conference call are received from the participants. For each passcode entered, user information is obtained from the person assigned the passcode. As described above, the user information can be obtained during the preparation phase and retrieved by the processor during performance of the response actions. The user information includes an employee number, an identification badge number, a home telephone number, a home address, a mobile telephone number, an e-mail address, an office telephone number, an office address, and/or answer(s) to security question(s) entered by the person assigned the passcode. In at least one embodiment, the user information is input into an electronic database by the system administrator, moderator, and/or another employee of the user's company, wherein the user information is subsequently retrieved from the database for validation purposes.

Validation information is obtained from the participant who entered the passcode. If the first information matches the second information, an alert is sent to the participant indicating that the waiting period exceeds the threshold period. If the first information does not match the second information, actions are performed by the processor 640.

In at least one embodiment of the invention, further actions include permitting the administrator of the conference calling system to enter the conference call, disconnecting a participant from the conference call, terminating the conference call, and/or voiding a passcode to the conference call.

Another action generates and stores a report (e.g., in an electronic database) via a report generating module 644 in the processor 640. In another embodiment, the report generating module 644 is outside the processor 640. In at least one embodiment, the report includes the time of entry of the moderator, the time of the entry of the participants, the threshold period, the waiting periods, and/or the passcodes to the conference call. The report also includes the actions performed, including the user information from the person assigned a passcode, and the validation information from the participant. As described above, information in the report is utilized to identify trends, track moderator ID and/or passcode usage, and/or for detailed review by the conference system administrator and/or personnel within the true moderator's company. For example, in at least one embodiment, the conference system administrator compares reports that have been collected over time in order to identify trends, such as a particular passcode that repeatedly violates the MPMST threshold and/or a particular time of day that the MPMST threshold is frequently violated.

Accordingly, an embodiment of the invention includes systems and methodologies to investigate potential fraudulent activity on conference calling systems. The occurrence of a potential fraudulent condition is identified, such that rapid response actions may be taken. The embodiments of the invention can save thousands of dollars in fraudulent toll charges. Moreover, the ability to identify fraudulent activity can prevent the loss of information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
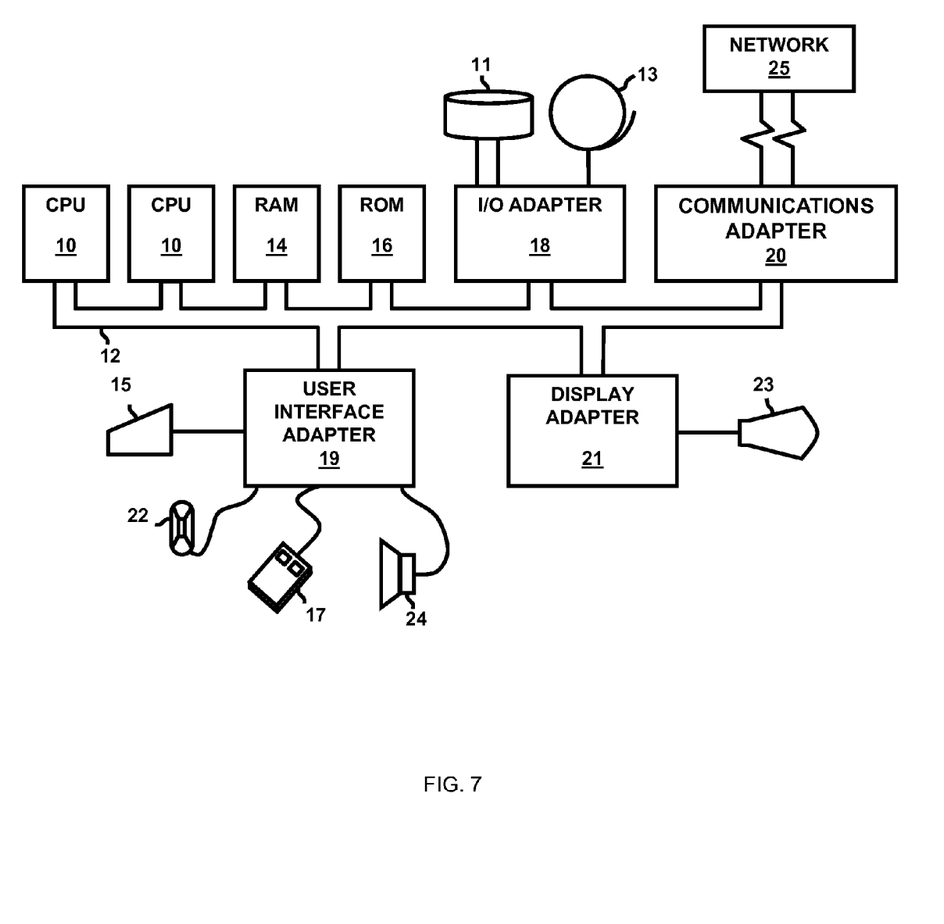
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting fraudulent use in a conference calling system, said method including:
   receiving a threshold period, the threshold period indicating a maximum allowable time period for a participant of a conference call to enter the conference call prior to the entry of the moderator of the conference call;
   detecting the entry of the moderator into the conference call;
   detecting entry of at least one participant into the conference call;
   determining a waiting period for the at least one participant, the waiting period including a time period between the entry of the at least one participant and the entry of the moderator;
   comparing the waiting period to the threshold period with a processor; and
   performing actions with the processor if the waiting period exceeds the threshold period.

2. The method according to claim 1, further including permitting the conference call to continue if the threshold period exceeds the waiting period.

3. The method according to claim 1, further including: receiving a passcode to enter the conference call from the at least one participant; obtaining first information from a person assigned the passcode; obtaining second information from the at least one participant; and determining whether the first information matches the second information.

4. The method according to claim 3, wherein the actions include sending an alert to the at least one participant if the first information matches the second information, the alert indicating that the waiting period exceeds the threshold period.

5. The method according to claim 3, wherein the first information includes at least one of an employee number, an identification badge number, a home telephone number, a home address, a mobile telephone number, an e-mail address, an office telephone number, an office address, and at least one answer to at least one security question entered by the person assigned the passcode.

6. The method according to claim 1, wherein said of the actions includes sending an alert to at least one of an administrator of the conference calling system, a moderator of the conference call, participants of the conference call, and at least one security personnel, the alert indicating that the waiting period for at least one participant exceeded the threshold period.

7. The method according to claim 1, wherein the actions include at least one of permitting an administrator of the conference calling system to enter the conference call, disconnecting the at least one participant from the conference call, terminating the conference call, and voiding at least one passcode to the conference call.

8. The method according to claim 1, wherein the actions include generating and storing a report, where the report includes at least one of time of the entry of the moderator, time of the entry of at least one participant, the threshold period, the waiting period, at least one passcode to the conference call, and the actions performed.

9. The method according to claim 8, wherein the actions include first information from a person assigned a passcode to the conference call, and second information from the at least one participant.

10. A method for detecting fraudulent use in a conference calling system, said method including:
receiving a scheduled start time for a conference call of the conference calling system;
receiving a threshold period, the threshold period indicating a maximum allowable time period for an attendee of the conference call to enter the conference call prior to the scheduled start time for the conference call;
determining a waiting period for at least one attendee of the conference call, the waiting period including a time period between a time that the at least one attendee entered the conference call and the scheduled start time of the conference call;
comparing the waiting period to the threshold period with a processor; and performing actions with the processor if the waiting period exceeds the threshold period.

11. The method according to claim 10, further including permitting the conference call to continue if the threshold period exceeds the waiting period.

12. The method according to claim 10, further including: receiving a passcode to enter the conference call from the at least one attendee; obtaining first information from a person assigned the passcode; obtaining second information from the at least one attendee; and determining whether the first information matches the second information.

13. The method according to claim 12, wherein the actions include, sending an alert to the at least one attendee if the first information matches the second information, the alert indicating that the waiting period exceeds the threshold period.

14. The method according to claim 12, wherein the first information includes at least one of an employee number, an identification badge number, a telephone number, a home address, an e-mail address, an office address, and at least one answer to at least one security question entered by the person assigned the passcode.

15. The method according to claim 10, wherein said of the actions includes sending an alert to at least one of an administrator of the conference calling system, a moderator of the conference call, participants of the conference call, and at least one security personnel, the alert indicating that the waiting period for at least one attendee exceeded the threshold period.

16. The method according to claim 10, wherein the actions include at least one of permitting an administrator of the conference calling system to enter the conference call, disconnecting the at least one attendee from the conference call, terminating the conference call, and voiding at least one passcode to the conference call.

17. The method according to claim 10, wherein the actions include generating and storing a report, where the report includes at least one of the scheduled start time for the conference call, the threshold period, the waiting period, the time that the at least one attendee entered the conference call, at least one passcode to the conference call, and the actions performed.

18. The method according to claim 17, wherein the actions include first information from a person assigned a passcode to the conference call, and second information from the at least one attendee.

19. A system for detecting fraudulent use in a conference calling system, said system including:
a user interface for receiving a scheduled start time for a conference call of said conference calling system and a threshold period, the threshold period including a maximum allowable time period for an attendee of the conference call to enter the conference call prior to the scheduled start time for the conference call; and
a processor operatively connected to said user interface, the processor:
determines a waiting period for at least one attendee of the conference call, the waiting period including a time period between a time that the at least one attendee entered the conference call and the scheduled start time of the conference call;
compares the waiting period to the threshold period, and performs at least one of validation actions and alert actions if the waiting period exceeds the threshold period.

20. The system according to claim 19, wherein said processor permits the conference call to continue if the threshold period exceeds the waiting period.

21. The system according to claim 19, wherein said system further includes a receiver for receiving a passcode to enter the conference call from the at least one attendee, wherein said user interface receives first information from a person assigned the passcode and stores the first information in a database, said receiver receives second information from the at least one attendee, wherein said processor determines whether the first information matches the second information, and wherein said processor includes an alert module, said alert module sends an alert to the at least one attendee if the first information matches the second information, the alert indicating that the waiting period exceeds the threshold period.

22. The system according to claim 19, wherein said processor includes an alert module, said alert module sends an alert to at least one of an administrator of said conference calling system, a moderator of the conference call, participants of the conference call, and at least one security personnel, the alert indicating that the waiting period exceeds the threshold period.

23. The system according to claim 19, wherein said processor does at least one of permits an administrator of said conference calling system to enter the conference call, disconnects the at least one attendee from the conference call, terminates the conference call, and voids at least one passcode to the conference call.

24. The system according to claim 19, further including a report generating module for generating and storing a report, where the report includes at least one of the scheduled start time for the conference call, the threshold period, the waiting period, the time that the at least one attendee entered the conference call, at least one passcode to the conference call, the alert actions performed, and the validation actions performed, wherein the validation actions include first information from a person assigned a passcode to the conference call, and second information from the at least one attendee.

25. A computer program product for detecting fraudulent use in a conference calling system, said computer program product including:
 a non-transitory computer readable storage medium;
 first program instructions to receive a scheduled start time for a conference call of the conference calling system;
 second program instructions to receive a threshold period, the threshold period including a maximum allowable time period for an attendee of the conference call to enter the conference call prior to the scheduled start time for the conference call;
 third program instructions to determine a waiting period for at least one attendee of the conference call, the waiting period including a time period between a time that the at least one attendee entered the conference call and the scheduled start time of the conference call;
 fourth program instructions to compare the waiting period to the threshold period with a processor; and
 fifth program instructions to perform at least one of validation actions and alert actions with the processor if the waiting period exceeds the threshold period,
 wherein said first program instructions, said second program instructions, said third program instructions, said fourth program instructions, and said fifth program instructions are stored on said computer readable storage medium.

\* \* \* \* \*